(12) United States Patent
Ambrus et al.

(10) Patent No.: US 12,387,503 B2
(45) Date of Patent: Aug. 12, 2025

(54) ADVERSARIAL OBJECT-AWARE NEURAL SCENE RENDERING FOR 3D OBJECT DETECTION

(71) Applicant: TOYOTA RESEARCH INSTITUTE, INC., Los Altos, CA (US)

(72) Inventors: Rares Andrei Ambrus, San Francisco, CA (US); Sergey Zakharov, San Francisco, CA (US); Vitor Guizilini, Santa Clara, CA (US); Adrien David Gaidon, Mountain View, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 421 days.

(21) Appl. No.: 17/964,827

(22) Filed: Oct. 12, 2022

(65) Prior Publication Data

US 2024/0135721 A1    Apr. 25, 2024

(51) Int. Cl.
*G06V 20/58* (2022.01)
*G06T 7/70* (2017.01)
*G06V 10/82* (2022.01)

(52) U.S. Cl.
CPC .............. *G06V 20/58* (2022.01); *G06T 7/70* (2017.01); *G06V 10/82* (2022.01)

(58) Field of Classification Search
CPC ........ G06V 20/58; G06V 10/82; G06V 20/64; G06V 10/774; G06V 20/56; G06T 7/70
See application file for complete search history.

(56) References Cited

U.S. PATENT DOCUMENTS 6,404,814 B1    6/2002    Apostolopoulos et al.
6,654,931 B1    11/2003    Haskell et al.
(Continued)

FOREIGN PATENT DOCUMENTS

CN    106354251 B    4/2019

OTHER PUBLICATIONS

Stelzner, et al., "Decomposing 3D scenes into objects via unsupervised volume segmentation", (https://arxiv.org/pdf/2104.01148.pdf), Apr. 2, 2021.
(Continued)

*Primary Examiner* — Syed Haider
(74) *Attorney, Agent, or Firm* — SEYFARTH SHAW LLP

(57) ABSTRACT

A method for improving 3D object detection via object-level augmentations is described. The method includes recognizing, using an image recognition model of a differentiable data generation pipeline, an object in an image of a scene. The method also includes generating, using a 3D reconstruction model, a 3D reconstruction of the scene from the image including the recognized object. The method further includes manipulating, using an object level augmentation model, a random property of the object by a random magnitude at an object level to determine a set of properties and a set of magnitudes of an object manipulation that maximizes a loss function of the image recognition model. The method also includes training a downstream task network based on a set of training data generated based on the set of properties and the set of magnitudes of the object manipulation, such that the loss function is minimized.

17 Claims, 6 Drawing Sheets

(56) References Cited

U.S. PATENT DOCUMENTS

| | | | |
|---|---|---|---|
| 9,323,218 | B2 | 4/2016 | Tsang |
| 9,824,495 | B2 | 11/2017 | Hagbi et al. |
| 10,395,343 | B2 | 8/2019 | Chaouch |
| 11,010,961 | B2 | 5/2021 | Stachniak et al. |
| 11,116,374 | B2 | 9/2021 | Dhindsa et al. |
| 2019/0147221 | A1* | 5/2019 | Grabner .............. G06T 7/75 382/103 |
| 2019/0291720 | A1* | 9/2019 | Xiao .............. G08G 1/0112 |
| 2019/0392630 | A1 | 12/2019 | Sturm et al. |
| 2021/0004660 | A1* | 1/2021 | Ambrus .............. G06N 3/08 |
| 2022/0358770 | A1* | 11/2022 | Guler .............. G06T 17/00 |
| 2023/0112302 | A1* | 4/2023 | Marks .............. G06T 13/80 345/419 |
| 2023/0351724 | A1* | 11/2023 | Hou .............. G06T 7/70 |

OTHER PUBLICATIONS

Lang, et al., "PointPillars: Fast Encoders for Object Detection from Point Clouds", (https://arxiv.org/pdf/1812.05784.pdf), May 7, 2019.

Ost, et al., "Neural Scene Graphs for Dynamic Scenes", (https://arxiv.org/pdf/2011.10379.pdf), Mar. 5, 2021.

Zakharov, et al., "DeceptionNet: Network-driven domain randomization", (https://openaccess.thecvf.com/content_ICCV_2019/papers/Zakharov_DeceptionNet_Network-Driven_Domain_Randomization_ICCV_2019_paper.pdf).

Zakharov, et al., "Single-Shot Scene Reconstruction", 5th Annual Conference on Robot Learning, 2011, (https://openreview.net/forum?id=CGn3XKSf7vf).

* cited by examiner

ADVERSARIAL OBJECT-AWARE NEURAL SCENE RENDERING FOR 3D OBJECT DETECTION

BACKGROUND

Field

Certain aspects of the present disclosure generally relate to machine learning and, more particularly, to adversarial object-aware neural scene rendering for 3D object detection.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained deep neural network (DNN) to identify objects within areas of interest in an image of a surrounding scene of an autonomous agent. For example, a DNN may be trained to identify and track objects captured by one or more sensors, such as light detection and ranging (LIDAR) sensors, sonar sensors, red-green-blue (RGB) cameras, RGB-depth (RGB-D) cameras, and the like. In particular, the DNN may be trained to understand a scene from a video input based on extensive amounts of annotations of automobiles within the scene. Unfortunately, annotating video is a time consuming and challenging task involving deep understanding of visual scenes. A network architecture to perform adversarial object-aware neural scene rendering for 3D object detection is desired.

SUMMARY

A method for improving 3D object detection via object-level augmentations is described. The method includes recognizing, using an image recognition model of a differentiable data generation pipeline, an object in an image of a scene. The method also includes generating, using a 3D reconstruction model, a 3D reconstruction of the scene from the image including the recognized object. The method further includes manipulating, using an object level augmentation model, a random property of the object by a random magnitude at an object level to determine a set of properties and a set of magnitudes of an object manipulation that maximizes a loss function of the image recognition model. The method also includes training a downstream task network based on a set of training data generated based on the set of properties and the set of magnitudes of the object manipulation, such that the loss function is minimized.

A non-transitory computer-readable medium having program code recorded thereon for improving 3D object detection via object-level augmentations is described. The program code is executed by a processor. The non-transitory computer-readable medium includes program code to recognize, using an image recognition model of a differentiable data generation pipeline, an object in an image of a scene. The non-transitory computer-readable medium also includes program code to generate, using a 3D reconstruction model, a 3D reconstruction of the scene from the image including the recognized object. The non-transitory computer-readable medium further includes program code to manipulate, using an object level augmentation model, a random property of the object by a random magnitude at an object level to determine a set of properties and a set of magnitudes of an object manipulation that maximizes a loss function of the image recognition model. The non-transitory computer-readable medium also includes program code to train a downstream task network based on a set of training data generated based on the set of properties and the set of magnitudes of the object manipulation, such that the loss function is minimized.

A system for improving 3D object detection via object-level augmentations is described. The system includes an image recognition model of a differentiable data generation pipeline to recognize an object in an image of a scene. The system also includes a 3D reconstruction model to generate a 3D reconstruction of the scene from the image including the recognized object. The system further includes an object level augmentation model to manipulate the object by a random magnitude at an object level to determine a set of properties and a set of magnitudes of an object manipulation that maximizes a loss function of the image recognition model. The system also includes a 3D training data module to train a downstream task network based on a set of training data generated based on the set of properties and the set of magnitudes of the object manipulation, such that the loss function is minimized.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
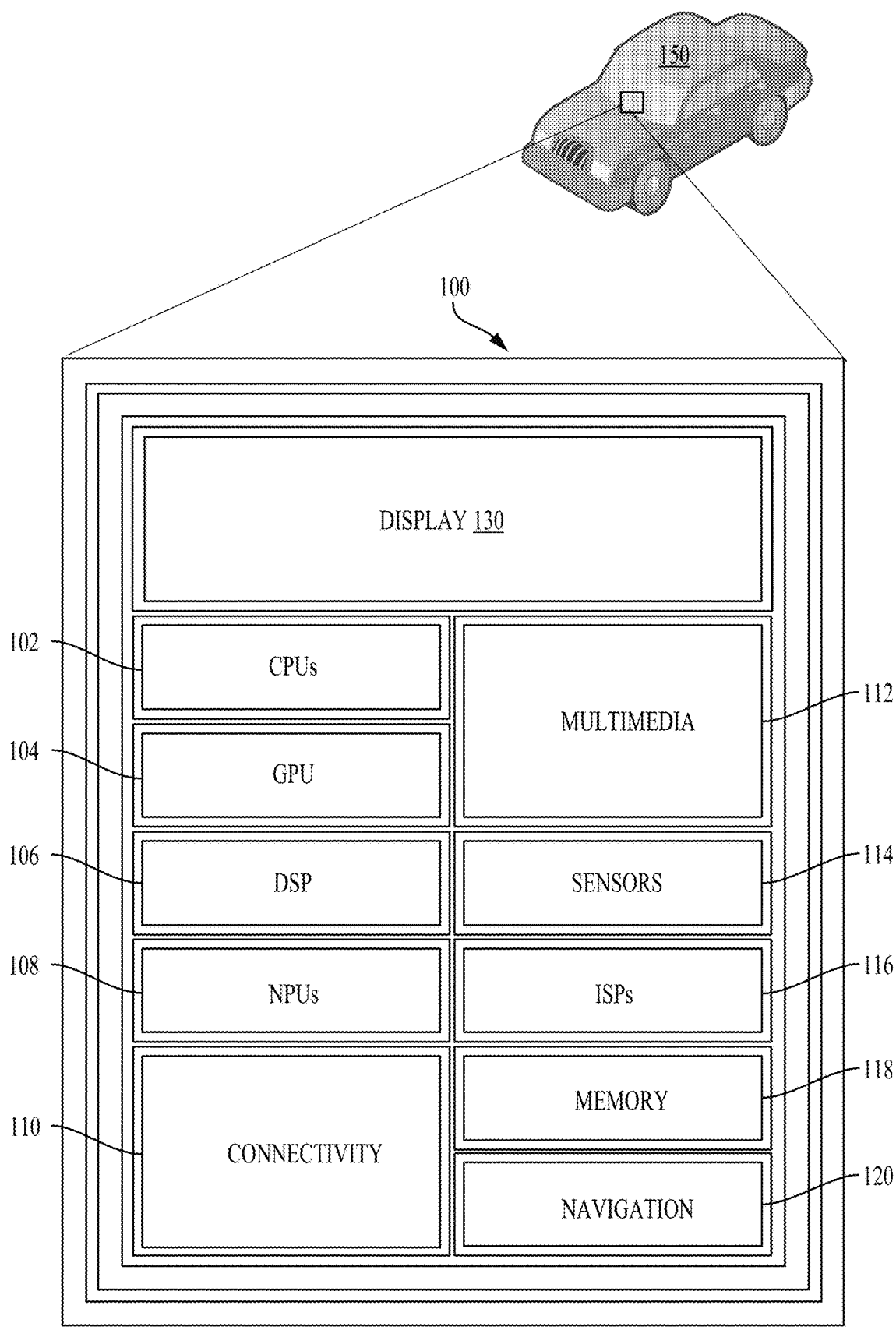
FIG. 1 illustrates an example implementation of designing a system using a system-on-a-chip (SOC) of neural scene rendering for 3D object detection, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Deep learning often involves large labeled datasets to reach state-of-the-art performance. In the context of three-dimensional (3D) object detection for autonomous vehicles and other robotics applications, 3D cuboids are an example of one annotation type. 3D cuboids are used because they allow for proper reasoning over all nine degrees of freedom. For example, the nine degrees of freedom may include three degrees of freedom for each instance of location, orientation, and metric extent. Unfortunately, acquiring enough labels to train 3D object detectors can be laborious and costly, as it mostly relies on a large number of human annotators. Conventional approaches to scaling up annotation pipelines include better tooling, active learning, or a combination thereof. These approaches, however, often rely on heuristics and involve humans in the loop to correct the semi-automatic labeling, especially for difficult edge cases.

In particular, conventional methods in the domain of deep learning are strongly reliant on supervised training regimes. While they can provide for immediate learning of mappings from input to output, supervision involves large amounts of annotated datasets to accomplish the task. Unfortunately, acquiring these annotated datasets is laborious and costly. Additionally, the cost of annotating varies greatly with the annotation type because 2D bounding boxes are much cheaper and faster to annotate than, for example, instance segmentations or cuboids. Some aspects of the present disclosure are directed to a fully differentiable data generation pipeline that can be combined and jointly optimized with a downstream task network for 3D object detection.

Some aspects of the present disclosure are directed to systems and methods for improving 3D object detection via learned object-level augmentations. In some aspects of the present disclosure, a system improves 3D object detection by creating multiple versions of an image that is used as training data for a 3D object detection network based on objects in the image. For example, the system may leverage neural implicit representations that are disentangled at the object level, as opposed to the pixel level. In this example, a first pass of the input data through a network identifies individual objects in a scene using a 3D object detection network model. The identified 3D objects may then be decomposed from the scene and randomly manipulated.

In some aspects of the present disclosure, decomposition allows individual extrinsic object manipulation (object pose—e.g., moving objects around), as well as intrinsic object manipulation (object properties—e.g., changing colors, material properties, etc.). For example, the color, location, and/or orientation of the 3D objects can be changed randomly and placed back in the scene to create multiple versions of the scene for further training of a 3D object detection network. In addition, the system may operate in a fully differentiable pipeline to generate the new data. Because the system is differentiable, it can be combined with a downstream task network (e.g., a 3D object detection network) and jointly optimized.

Moreover, the system can leverage an adversarial mechanism for generating novel data of known objects. This mechanism can exploit downstream task uncertainty and generate augmentations that are ordinarily difficult to solve by downstream task networks. For example, the system can go beyond simply randomizing extrinsic and intrinsic properties to learning entity manipulation operations in the latent space, via a neural network, in an adversarial setting. Specifically, it may learn how to manipulate the objects in the scene such that the task of the 3D object detection network is made more difficult (i.e., by maximizing a loss function rather than minimizing). Training a computer vision model on difficult images of known objects generated by the system will lead to a more robust computer vision model. These aspects of the present disclosure enable a fully differentiable data generation pipeline that can be combined and jointly optimized with a downstream task network.

FIG. 1 illustrates an example implementation of the aforementioned system and method of neural scene rendering for 3D object detection using a system-on-a-chip (SOC)

100 of an ego vehicle 150. The SOC 100 may include a single processor or multi-core processors (e.g., a central processing unit), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for neural scene rendering of a scene within an image captured by the sensor processor 114. The instructions loaded into a processor (e.g., CPU 102) may also include code for planning and control (e.g., of the ego vehicle) in response to linking the 3D objects over time, creating smooth trajectories while respecting the road and physical boundaries from images captured by the sensor processor 114.

The instructions loaded into a processor (e.g., NPU 108) may also include code to recognize, using an image recognition model of a differentiable data generation pipeline, an object in an image of a scene. The instructions loaded into a processor (e.g., NPU 108) may also include code to generate a 3D reconstruction of the scene from the image including the recognized object. The instructions loaded into a processor (e.g., NPU 108) may further include code to manipulate a random property of the object by a random magnitude at an object level to determine a set of properties and a set of magnitudes of an object manipulation that maximizes a loss function of the image recognition model. The instructions loaded into a processor (e.g., NPU 108) may also include code to train a downstream task network based on a set of training data generated based on the set of properties and the set of magnitudes of the object manipulation, such that a loss function is minimized.

Figure 2:
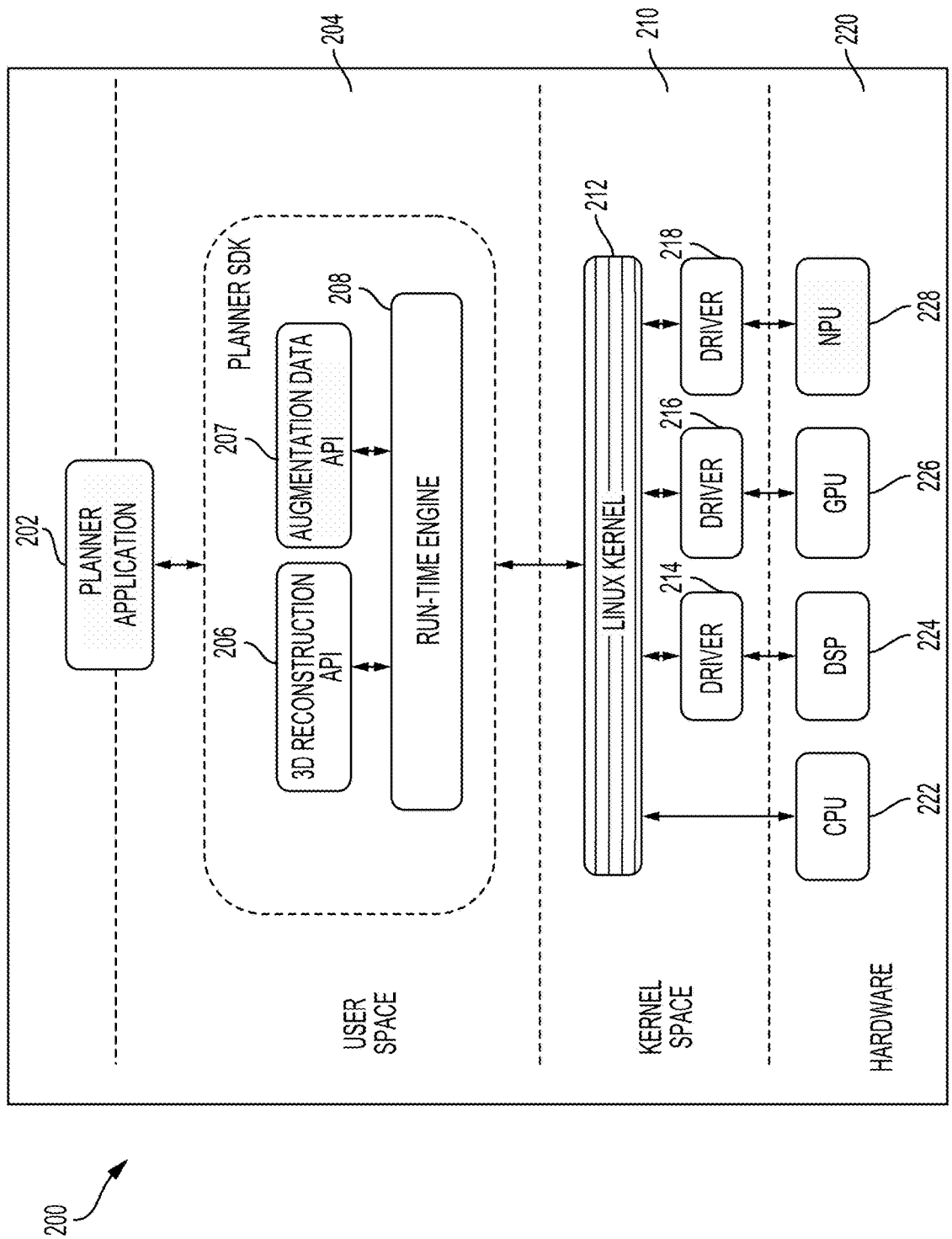
FIG. 2 is a block diagram illustrating a software architecture that may modularize functions of neural scene rendering for 3D object detection, according to aspects of the present disclosure.

FIG. 2 is a block diagram illustrating a software architecture 200 that may modularize functions for neural scene rendering for 3D object detection, according to aspects of the present disclosure. Using the architecture, a planner application 202 may be designed such that it may cause various processing blocks of an SOC 220 (for example a CPU 222, a DSP 224, a GPU 226, and/or an NPU 228) to perform supporting computations during run-time operation of the planner application 202.

The planner application 202 may be configured to call functions defined in a user space 204 that may, for example, reconstruct a scene in a video captured by a monocular camera of an ego vehicle and augmenting objects in the scene to generate novel data from known objects. Some aspects of the present disclosure are directed to systems and methods for improving 3D object detection via learned object-level augmentations. In some aspects of the present disclosure, a system improves 3D object detection by creating multiple versions of an image that is used as training data for a 3D object detection network based on objects in the image.

The planner application 202 may make a request to compile program code associated with a library defined in a 3D reconstruction application programming interface (API) 206 to generate a 3D reconstruction of a scene from an image including a recognized object. The planner application 202 may make a request to compile program code associated with a library defined in an augmentation data API 207 to manipulate a random property of the object by a random magnitude at an object level to determine a set of properties and a set of magnitudes of an object manipulation that maximizes a loss function of an image recognition model.

A run-time engine 208, which may be compiled code of a run-time framework, may be further accessible to the planner application 202. The planner application 202 may cause the run-time engine 208, for example, to for neural scene rendering for 3D object detection. When an object is detected within a predetermined distance of the ego vehicle, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
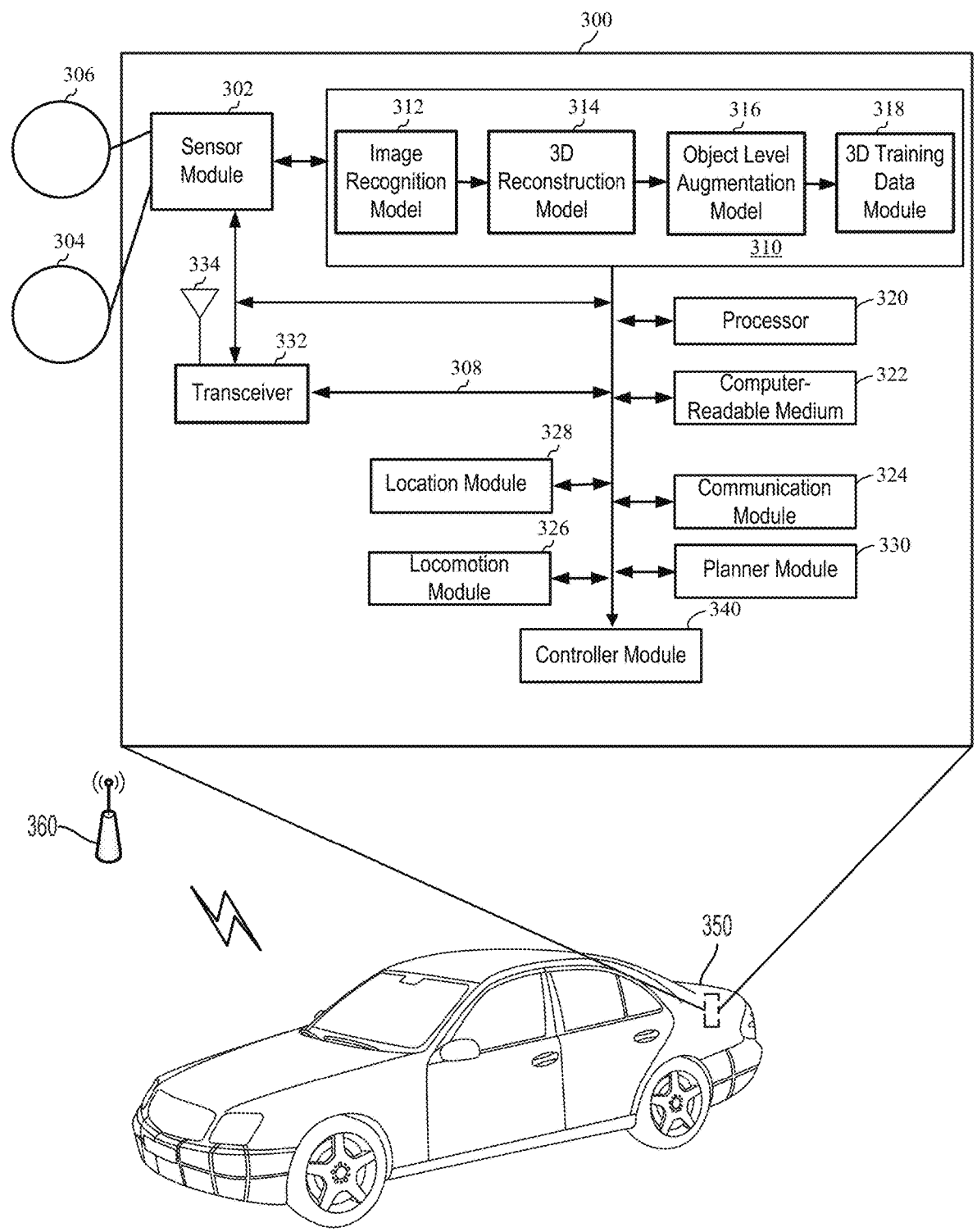
FIG. 3 is a diagram illustrating an example of a hardware implementation of neural scene rendering for 3D object detection, according to aspects of the present disclosure.

FIG. 3 is a diagram illustrating an example of a hardware implementation for a 3D object detection system 300 trained using neural scene rendering, according to aspects of the present disclosure. The 3D object detection system 300 may be configured for understanding a scene to enable planning and controlling an ego vehicle in response to images from video captured through a camera during operation of a car 350. The 3D object detection system 300 may be a component of a vehicle, a robotic device, or other device. For example, as shown in FIG. 3, the 3D object detection system 300 is a component of the car 350. Aspects of the present disclosure are not limited to the 3D object detection system 300 being a component of the car 350, as other devices, such as a bus, motorcycle, or other like vehicle, are also contemplated for using the 3D object detection system 300. The car 350 may be autonomous or semi-autonomous. Although described with reference to the car 350, it should be recognized that the 3D object detection system 300 may be implemented using an offline process, in which the car 350 is limited to data collection.

The 3D object detection system 300 may be implemented with an interconnected architecture, represented generally by an interconnect 308. The interconnect 308 may include any number of point-to-point interconnects, buses, and/or bridges depending on the specific application of the 3D object detection system 300 and the overall design constraints of the car 350. The interconnect 308 links together various circuits, including one or more processors and/or hardware modules, represented by a sensor module 302, a vehicle perception module 310, a processor 320, a computer-readable medium 322, a communication module 324, a locomotion module 326, a location module 328, a planner module 330, and a controller module 340. The interconnect 308 may also link various other circuits such as timing sources, peripherals, voltage regulators, and power management circuits, which are well known in the art, and therefore, will not be described any further.

The 3D object detection system 300 includes a transceiver 332 coupled to the sensor module 302, the vehicle perception module 310, the processor 320, the computer-readable medium 322, the communication module 324, the locomotion module 326, the location module 328, a planner module 330, and the controller module 340. The transceiver 332 is coupled to an antenna 334. The transceiver 332 communicates with various other devices over a transmission medium. For example, the transceiver 332 may receive commands via transmissions from a user or a remote device. As discussed herein, the user may be in a location that is remote from the location of the car 350. As another example, the transceiver 332 may transmit detected 3D objects within a video and/or planned actions from the vehicle perception module 310 to a server (not shown).

The 3D object detection system 300 includes the processor 320 coupled to the computer-readable medium 322. The processor 320 performs processing, including the execution of software stored on the computer-readable medium 322 to provide neural scene rendering functionality to train a 3D object detection network, according to the present disclosure. The software, when executed by the processor 320, causes the 3D object detection system 300 to perform the various functions described for ego vehicle perception of 3D object detected scenes within video captured by a single camera of an ego vehicle, such as the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain images via different sensors, such as a first sensor 304 and a second sensor 306. The first sensor 304 may be a vision sensor (e.g., a stereoscopic camera or a red-green-blue (RGB) camera) for capturing 2D RGB images. The second sensor 306 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 304 or the second sensor 306.

The images of the first sensor 304 and/or the second sensor 306 may be processed by the processor 320, the sensor module 302, the vehicle perception module 310, the communication module 324, the locomotion module 326, the location module 328, and the controller module 340. In conjunction with the computer-readable medium 322, the images from the first sensor 304 and/or the second sensor 306 are processed to implement the functionality described herein. In one configuration, detected 3D object information captured by the first sensor 304 and/or the second sensor 306 may be transmitted via the transceiver 332. The first sensor 304 and the second sensor 306 may be coupled to the car 350 or may be in communication with the car 350.

The location module 328 may determine a location of the car 350. For example, the location module 328 may use a global positioning system (GPS) to determine the location of the car 350. The location module 328 may implement a dedicated short-range communication (DSRC)-compliant GPS unit. A DSRC-compliant GPS unit includes hardware and software to make the car 350 and/or the location module 328 compliant with one or more of the following DSRC standards, including any derivative or fork thereof: EN 12253:2004 Dedicated Short-Range Communication—Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 328 is operable to provide GPS data describing the location of the car 350 with space-level accuracy for accurately directing the car 350 to a desired location. For example, the car 350 is driving to a predetermined location and desires partial sensor data. Space-level accuracy means the location of the car 350 is described by the GPS data sufficient to confirm a location of the car 350 parking space. That is, the location of the car 350 is accurately determined with space-level accuracy based on the GPS data from the car 350.

The communication module 324 may facilitate communications via the transceiver 332. For example, the communication module 324 may be configured to provide communication capabilities via different wireless protocols, such as Wi-Fi, long term evolution (LTE), 3G, etc. The communication module 324 may also communicate with other components of the car 350 that are not modules of the 3D object detection system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The 3D object detection system 300 also includes the planner module 330 for planning a selected trajectory to perform a route/action (e.g., collision avoidance) of the car 350 and the controller module 340 to control the locomotion of the car 350. The controller module 340 may perform the selected action via the locomotion module 326 for autonomous operation of the car 350 along, for example, a selected route. In one configuration, the planner module 330 and the controller module 340 may collectively override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

- Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.
- Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.
- Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.
- Level 3: In a Level 3 ADAS vehicle, within known, limited environments (such as freeways), the driver can safely turn their attention away from driving tasks, but must still be prepared to take control of the autonomous vehicle when needed.
- Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.
- Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 350 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; and an HAV.

The vehicle perception module 310 may be in communication with the sensor module 302, the processor 320, the computer-readable medium 322, the communication module 324, the locomotion module 326, the location module 328, the planner module 330, the transceiver 332, and the controller module 340. In one configuration, the vehicle perception module 310 receives sensor data from the sensor module 302. The sensor module 302 may receive the sensor data from the first sensor 304 and the second sensor 306. According to aspects of the present disclosure, the vehicle perception module 310 may receive sensor data directly from the first sensor 304 or the second sensor 306 to perform 3D auto-labeling of vehicle and non-vehicle objects from images captured by the first sensor 304 or the second sensor 306 of the car 350.

As shown in FIG. 3, the vehicle perception module 310 includes an image recognition model 312, a 3D reconstruction model 314, an object level augmentation model 316, and a 3D training data module 318. The image recognition model 312, the 3D reconstruction model 314, the object level augmentation model 316, and the 3D training data module 318 may be components of a same or different artificial neural network, such as a deep neural network (DNN). The image recognition model 312 and the object level augmentation model 316 are not limited to a deep neural network. In operation, the vehicle perception module 310 receives a data stream from the first sensor 304 and/or the second sensor 306. The data stream may include a 2D RGB image from the first sensor 304 and LIDAR data points from the second sensor 306. The data stream may include multiple frames, such as image frames. In this configuration, the first sensor 304 captures monocular (single camera) 2D RGB images.

Understanding a scene from a video input based on detected 3D objects within a scene is an important perception task in the area of autonomous driving, such as the car 350. Conventional methods in the domain of deep learning are strongly reliant on supervised training regimes. While they can provide for immediate learning of mappings from input to output, supervision involves large amounts of annotated datasets to accomplish the task. Unfortunately, acquiring these annotated datasets is laborious and costly. Additionally, the cost of annotating varies greatly with the annotation type because 2D bounding boxes are much cheaper and faster to annotate than, for example, instance segmentations or cuboids. Some aspects of the present disclosure are directed to a fully differentiable data generation pipeline that can be combined and jointly optimized with a downstream task network for 3D object detection.

The vehicle perception module 310 is configured to understand a scene from a video input (e.g., the sensor module 302) based on neural scene rendering of objects (e.g., vehicles) within the scene as a perception task during autonomous driving of the car 350. Aspects of the present disclosure are directed to a method of neural scene rendering for 3D object detection including recognizing, by the image recognition model 312, an object in an image of a scene captured by the car 350. Although described with reference to the car 350, it should be recognized that the 3D object detection system 300 may be implemented using an offline process, in which the car 350 is limited to data collection.

Once the object is recognized, the 3D reconstruction model 314 generates a 3D reconstruction of the scene from the image including the recognized object. In addition, the object level augmentation model 316 manipulates a random property of the object by a random magnitude at an object level to determine a set of properties and a set of magnitudes of an object manipulation that maximizes a loss function of the image recognition model 312. The 3D training data module 318 trains a downstream task network based on a set of training data generated based on the set of properties and the set of magnitudes of the object manipulation, such that a loss function is minimized.

Overview of Differentiable Data Generation Pipeline

Figure 4:
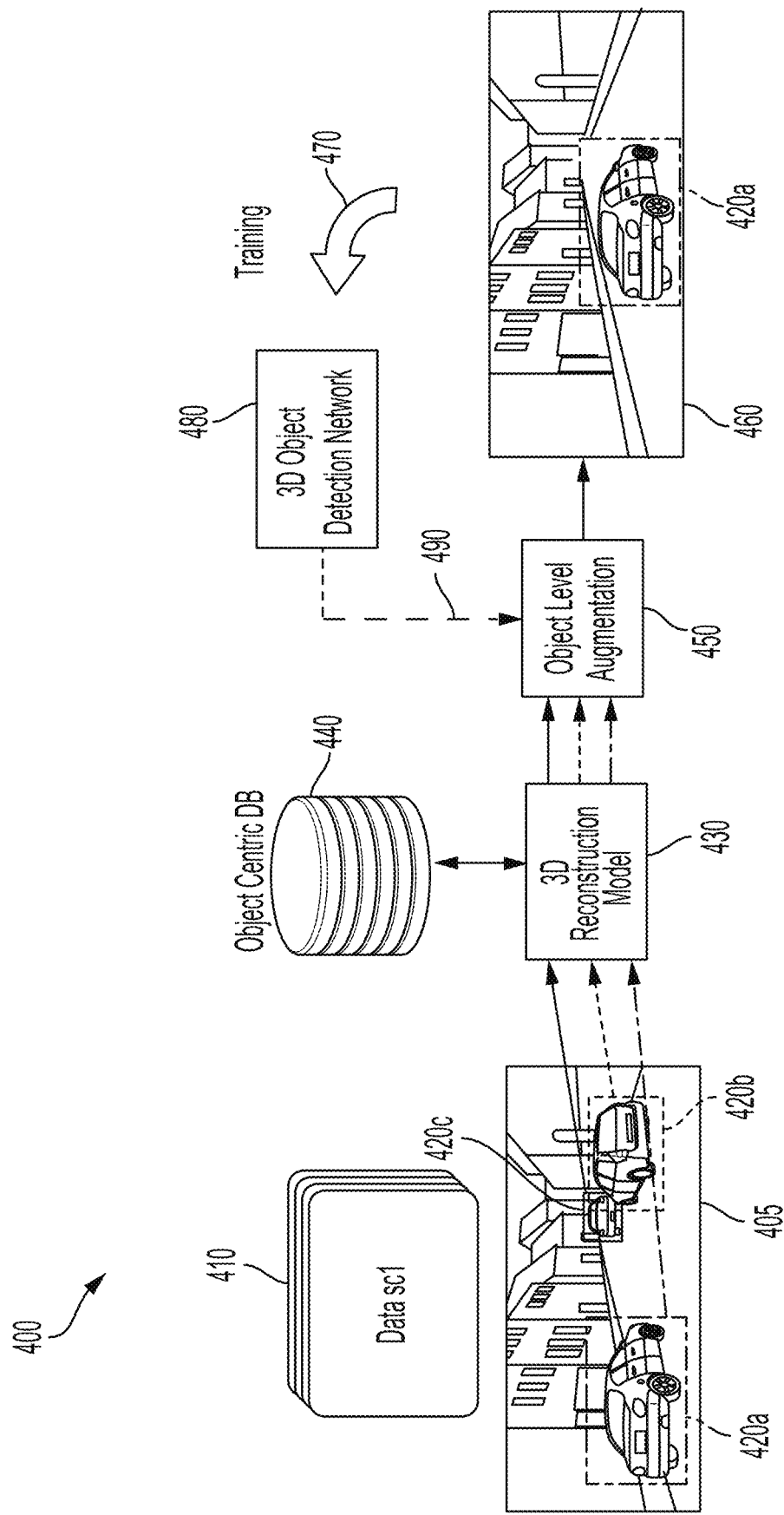
FIG. 4 is a block diagram of a differential data generation pipeline for generating neural scene rendering to train a 3D object detection network, in accordance with an illustrative configuration of the present disclosure.

FIG. 4 is a block diagram of a differential data generation pipeline 400 for generating neural scene rendering to train a 3D object detection network, in accordance with an illustrative configuration of the present disclosure. In FIG. 4, a dataset 410 potentially includes both real image data and/or synthetic input data. As shown in FIG. 4, an input image 405 may be an RGB image including 3D object labels, such as 3D bounding boxes and image masks. In aspects of the present disclosure, the bounding boxes and image mask may be determined from ground truth or recognized by an image recognition model, such as the image recognition model 312 of FIG. 3.

Figure 5:
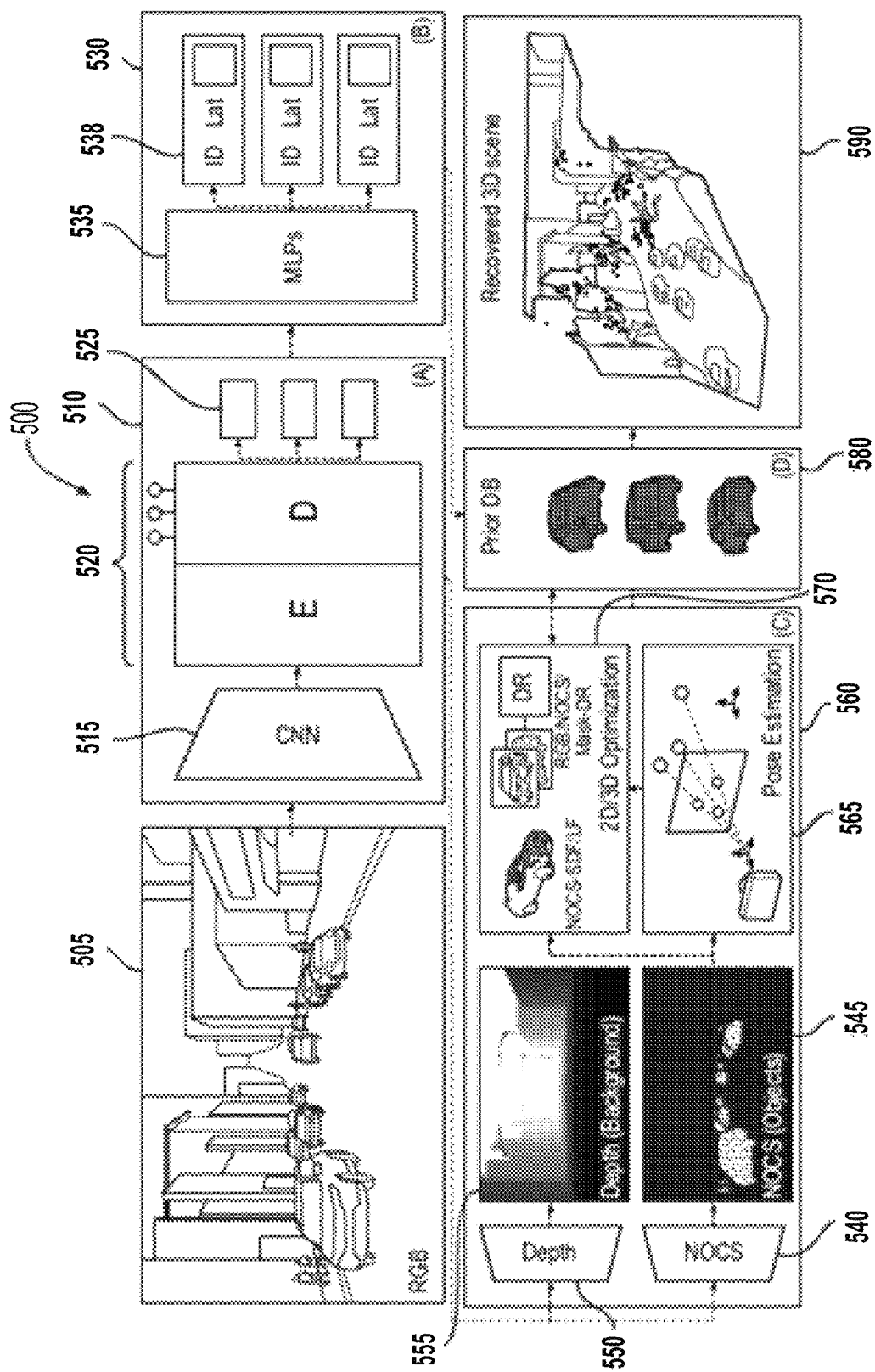
FIG. 5 illustrates a block diagram of a reconstruction system architecture of the 3D reconstruction model of FIG. 4, in accordance with aspects of the present disclosure.

In the example of FIG. 4, a 3D object detector (e.g., the image recognition model 312 of FIG. 3) has detected three vehicles in the input image 405 and has labeled them, respectively, with a 3D label 420a, a 3D label 420b, and a 3D label 420c. In this example, the 3D labels are 3D bounding boxes. The image recognition model 312 provides the 3D label 420a, the 3D label 420b, and the 3D label 420c as inputs to a 3D reconstruction model 430, which may be configured, for example, as shown in FIG. 5. In some aspects of the present disclosure, the 3D reconstruction model 430 uses an object centric database 440 storing pre-built, object centric implicit representations of objects to generate a 3D reconstruction of the input image 405.

In this aspect of the present disclosure, an object level augmentation model 450 randomly generates an augmentation image 460 from the input image 405 using the 3D reconstruction of the scene generated by the 3D reconstruction model 430. For example, the object level augmentation model 450 generates the augmentation image 460 by manipulating the detected vehicle objects (e.g., as shown by the 3D label 420a, the 3D label 420b, and the 3D label 420c). In this example, the object level augmentation model 450 generates the augmentation image 460 by removing the detected vehicle objects represented by the 3D label 420b and the 3D label 420c. In addition, a detected vehicle object represented by the 3D label 420a is manipulated so that the detected vehicle object is now driving in the opposite direction.

In some aspect of the present disclosure, the augmentation image 460 is provided as input to a downstream task network. In this example, the downstream task network is a 3D object detection network 480 that undergoes training 470 based on the augmentation image 460. In this example, the 3D object detection network 480 provides a downstream task gradient 490 as feedback to the object level augmentation model 450. In some aspects of the present disclosure, the object level augmentation model 450 is guided by the downstream task gradient 490, in which the augmentation image 460 is generated by a neural network of the object level augmentation model 450.

FIG. 5 illustrates a block diagram of a reconstruction system architecture 500 of the 3D reconstruction model 430 of FIG. 4, in accordance with aspects of the present disclosure. This aspect of the present disclosure is directed to autonomous or semi-autonomous driving. Thus, the car 350, in this configuration, is a semi-autonomous or autonomous vehicle. Note that FIG. 5 is divided into functional Sections (A), (B), (C), and (D) to facilitate the discussion that follows.

Given an RGB image 505 of a typical driving scene, the reconstruction system architecture 500 illustrated in FIG. 5 holistically reconstructs the scene by explaining each of the visible pixels and predicting the full geometry and appearance of detected objects and occluded areas that are not visible in the RGB image 505. This aspect of the present disclosure involves a combination of three components: a scene decomposition network (SDN), a differentiable database of objects (e.g., object centric DB 440), and a 2D/3D optimization pipeline.

One component of the reconstruction system architecture 500 shown in FIG. 5 is the scene decomposition network (SDN). In some aspects of the present disclosure, the SDN estimates the layout of the scene, detects and identifies visible objects, and recovering the geometry of both the background and the detected objects. In the reconstruction system architecture 500 shown in FIG. 5, the SDN is divided into a detection transformer block (Section (A)), an object reasoning block (Section (B)), and a 3D reasoning block (Section (C)).

Detection Transformer Block (Section (A)). As shown in FIG. 5, a detection transformer block 510 includes a convolutional neural network (CNN) 515 (e.g., a ResNet101 backbone) that extracts a set of features from the RGB image 505 and an encoder-decoder (ED) transformer neural network 520 that constructs attention maps between features in the set of extracted features. In some aspects of the present disclosure, the ED transformer neural network 520 applies a self-attention mechanism to explicitly model pairwise interactions between elements in a sequence, making the reconstruction system architecture 500 particularly suitable for specific constraints of set prediction (e.g., duplicate suppression). For example, the notion of object queries is used to retrieve output features for each of the detected objects, which are then used as input to the object reasoning block 530 and 3D reasoning block 560. More particularly, the ED transformer neural network 520 outputs a latent vector 525 (sometimes referred to herein as the "first latent vector") for each detected object. Each latent vector 525 for the detected objects becomes an input to object reasoning block 530.

Object Reasoning Block (Section (B)). In this example, the object reasoning block 530 takes output features (e.g., the latent vector 525) of the detection transformer block 510 and uses a collection of multilayer perceptrons (MLPs) 535 to predict important properties for each detected object. In some aspects of the present disclosure, a 3-layer perceptron with rectilinear unit (ReLU) activation and a linear projection layer is used to regress object class IDs (identifiers) and 2D bounding boxes for the respective detected objects. Additionally, the object reasoning block 530 regresses signed-distance-field (SDF) and luminance-field (LF) feature vectors (sometimes referred to herein collectively as the "second latent vector" for each detected object), denoted by $z_{sdf}$ and $z_{lf}$ respectively. These feature vectors (the "second latent vector") represent the detected object in Prior DB 580 (e.g., the object centric DB 440 of FIG. 4). In other words, these feature vectors provide an initial state for object reconstruction via the Prior DB 580. The 3D shape estimates of the detected objects are then refined by a 3D reasoning block 560. As shown in FIG. 5, the class IDs, 2D bounding boxes, and latent vectors ("Lat" in FIG. 5) encompassing the SDF and LF feature vectors just mentioned are collectively labeled as MLP outputs 538.

3D Reasoning Block (Section (C)). In this example, the 3D reasoning block 560 recovers 3D scene information by splitting the scene into two parts: a background containing road surfaces, buildings, and other objects not detected by the ED transformer neural network 520 and a foreground consisting entirely of detected objects. The output of the ED transformer neural network 520 for each object is used to compute multi-head attention scores of this embedding over the output of the ED transformer neural network 520, generating M attention heatmaps per object. These masks are then used to regress the geometry for both foreground and background.

In some aspects of the present disclosure, the foreground is predicted as a set of normalized shape maps (NOCS maps 545 produced by a NOCS network 540). Because they encode 3D coordinates via RGB, visualizing each 3D color component in 3D space enables 3D reasoning block 560 to recover a partial 3D shape of the object in its normalized coordinate space. This is illustrated in FIG. 5, which shows a partial 3D shape that has been recovered from one of the NOCS maps 545 of a detected object. This partial 3D shape enables the processing pipeline to retrieve the object's full geometry and pose.

The background, on the other hand, is represented as a depth map 555 (produced by a depth network 550), because the primary focus is on its geometry. For view synthesis applications, the depth and appearance behind the detected objects can also be predicted by using a generative-adversarial-network-(GAN)-like encoder-decoder generator architecture. This architecture takes masked RGB and depth images and in-paints RGB and depth values for occluded regions, employing a fully convolutional PatchGAN discriminator to judge the genuineness of the in-painted maps.

Given estimated object masks and NOCS maps, the 3D reasoning block 560 recovers three things that enable a pose estimation 565: (1) 2D coordinates of the object in the RGB image 505, (2) 3D points of the partial 3D object shape in the canonical frame of reference, and (3) their 2D-3D correspondences. This unique representation avoids the storing of a collection of 3D primitives and identifies them to find a detected model, because both 3D and 2D information is contained in the form of a 3-channel map. The recovered normalized shape is multiplied by the per-class scale factor to recover absolute scale. The six-degrees-of-freedom (6DoF) pose is then estimated using a PnP algorithm that predicts the object pose from given correspondences and camera intrinsics. Because there are a large set of correspondences for each model, PnP is, in some configurations, combined with RANSAC to increase the robustness of the system against outliers.

Another component of the reconstruction system architecture 500 shown in FIG. 5 is a 2D/3D optimization process 570 that is enabled by the Prior DB 580 (see Section (D) in FIG. 5) and a surfel-based differentiable rendering pipeline. The object priors in Prior DB are learned using coordinate-based MLPs, taking positionally encoded features as input and recovering geometry in the form of SDF and appearance on the object's surface. In one configuration, a 0-isosurface projection is used to retrieve an object's surface from an SDF field. In this example, an initial recovered object is refined to fit both predicted observations in terms of masks and one of the NOCS maps 545, as well as ground-truth RGB values from the RGB image 505 provided as the original input.

Given output features corresponding to detected objects regressed by object reasoning block 530, the optimization process 570 and the pose estimation 565 generates full shapes, appearances, and poses for all of the objects in the scene to form a recovered 3D scene 590.

The 2D/3D optimization process 570 leverages a differentiable database of object priors, Prior DB 580, as discussed above. The Prior DB 580 encodes the shape and luminance of the input models as SDFs and LFs with associated latent feature vectors (again, these latent feature vectors are sometimes referred to herein collectively as the "second latent vector" for a given detected object). Given a partial shape observation, the 2D/3D optimization process 570 differentiates against Prior DB to find the maximum likelihood latent vector that best explains the observed shape. The RGB component is optimized similarly, as discussed in greater detail below.

As discussed above, Prior DB 580 represents objects as SDFs (with positive and negative values pointing to exterior and interior areas, respectively), in which each value corresponds to the distance to the closest surface. A single MLP can be used to represent multiple geometries using a single feature vector $z_{sdf}$ and query 3D locations $x=\{x_1, \ldots, x_N\}$ as $f_{sdf}(x; z_{sdf})=s$. Object appearances, on the other hand, are represented as LFs, as discussed above, defining the prior perceived luminance of the object as seen in the training set. Similar to the SDN discussed above, the LF module is implemented as an MLP, but it takes a feature vector by concatenating $z_{sdf}$ and $z_{lf}$, as well as query locations x as input, and outputs resulting luminance as $f_{lf}(X; z_{sdf}; z_{lf})=1$.

In the configuration shown in FIG. 5, both SDF and LF modules are trained using synthetic data containing high-quality, realistic road scene renderings together with ground-truth annotations. In this configuration, a collection of canonical ground-truth point clouds and associated surface normals representing rendered objects are used to train the SDF module. In one configuration, a total of 27 vehicles are encoded in Prior DB 580. A multi-level octree spanning the volume $[-1,1]^3$ is first defined with points located at the corners of the imaginary voxels of various sizes, depending on the level. For each of the point clouds, unsigned distances are defined by computing nearest neighbors to the octree points. Next, the loss $L_{sdf}$ is defined as the distance to the surface at grid points starting from the coarsest level, gradually increasing the resolution up to the highest level, while considering only points located at pre-defined per-level distances to the surface. In one embodiment, three levels of granularity are used. To ensure that a correct signed field is learned, the distance is minimized between the ground-truth surface normal and an analytically-derived surface normal from the SDF module. Moreover, to ensure that plausible shapes are regressed regardless of the input feature vector, an additional round of refinement is included by sampling random feature vectors and enforcing the output to be equal to the shape of the nearest plausible neighbor.

Once the SDF module has been trained, SDF features $z_{sdf}$ associated with objects are stored, and they are used to train the LF module. In one embodiment, the LF module is trained on partial canonical shapes recovered from provided RGB renderings (refer to Section (A) of FIG. 5) associated with depth maps and poses. The luminance component is computed from RGB renderings, and the LF of each feature is enforced to be the same. The network weights are then optimized to fit the average luminance per object using an L1 loss. Additionally, a symmetry loss $L_{symm}$ is defined enforcing colors on the left side of an object (e.g., a vehicle) to be similar to those on the right side. This can be accomplished by computing nearest neighbors between the left side of the object and an inverted right side and then minimizing the L1 distance between these correspondences.

In the configuration illustrated in FIG. 5, the optimizer takes partial canonical object shape and appearance observations (e.g., recovered from a predicted one of the NOCS maps 545, as shown in Section (C) of FIG. 5), as well as initial Prior DB features. In the configuration of FIG. 5, due to the robustness of NOCS regression, despite occasional noisy outliers, it is set as the main optimization prior. The initially predicted SDF is used to recover the full surface of the object in the form of a point cloud with surface normals using a 0-isosurface projection. Then, the 2D/3D optimization process 570 estimates nearest neighbors between the two point clouds and minimizes the distance between the points by optimizing the feature vector $z_{sdf}$. The RGB component is optimized similarly by minimizing the color difference between the correspondences, but the LF-module weights are permitted to vary for a finer level of detail. In the case of RGB optimization, the $L_{symm}$ loss between the left and right sides of the predicted shape is applied, as discussed above.

Differentiable rendering allows the 2D/3D optimization process 570 to optimize objects with respect to both pose and shape. Because an SDF representation is used, differentiable renderers for triangulated meshes are not employed. Instead, the 2D/3D optimization process 570 includes a renderer that uses surfels as the primary representation, estimating surface points and normals using a 0-isosurface projection followed by a surfel-based rasterizer.

Surface elements or "surfels" are a common concept in computer graphics as an alternative to connected triangular primitives. To render watertight surfaces, the individual surface normals must sufficiently approximate the local region of the object's geometry.

$$d = \frac{n_i \cdot p_i}{n_i \cdot K^{-1}(u, v, 1)^T} \quad (1a)$$

$$P = K^{-1} \cdot (u \cdot d, v \cdot d, d)^T \quad (1b)$$

To construct surface discs, the 2D/3D optimization process 570 first estimates the 3D coordinates of the resulting tangent plane given the normal $$n_i = \frac{\partial f(p_i; z)}{\partial p_i}$$

of a projected point $p_i$. The distance d of the plane to each 2D pixel (u, v) is computed by solving a system of linear equations for the plane and camera projections, as defined in Eq. 1a, where $K^{-1}$ is the inverse camera matrix. Then, a 3D plane coordinate is obtained by back-projection (Eq. 1b). Finally, the distance between the plane vertex and surface point is estimated and clamped, if it is larger than a disc diameter, to obtain final discs $$M = \max(\text{diam} - \|p_i - P\|_2, 0)$$

The 2D/3D optimization process 570 combines colors from different surfel primitives based on their depth values to compose a final rendering. The distance of the primitive to the camera defines its final intensity contribution to the image. To ensure that all primitive contributions sum up to unity at each pixel, the 2D/3D optimization process 570 uses a modified softmax function. The final rendering function is given in Eq. 2a below, where I is the output image, S is the estimated one of the NOCS maps 545, and $w_i$ represents the weighting masks:

$$I = \sum_i S(p_i) * w_i, \quad (2a)$$

$$w_i = \frac{\exp(-\tilde{D}_i \sigma) M_i}{\sum_j \exp(-\tilde{D}_j \sigma) M_j}. \quad (2b)$$

Eq. 2b defines weighting masks $w_i$, where b is the normalized depth and a is a transparency weight with $\sigma \to \infty$ defining a completely opaque rendering as only the closest primitive is rendered.

Regarding 2D optimization, formally, the embodiment of FIG. 5 defines three losses on the rendering output: $L_{nocs_{2D}}$, $L_{If_{2D}}$, and $L_{mask_{2D}}$. $L_{nocs_{2D}}$ compares the output of the renderer with a predicted one of the NOCS maps 545. $L_{If_{2D}}$ compares the output of the renderer with RGB image 505 provided as the original input. $L_{mask_{2D}}$ compares the rendered and predicted masks. The final optimization loss is a weighted sum of both 2D and 3D components. While 3D components ensure a robust shape optimization, 2D losses help to better align the object in 3D space and provide a better luminance matching. These aspects of the present disclosure provide the recovered 3D scene 590 to enable the differential data generation pipeline 400 that is combined and jointly optimized with a downstream task network (e.g., the 3D object detection network 480) to perform a process, for example, as shown in FIG. 6.

Figure 6:
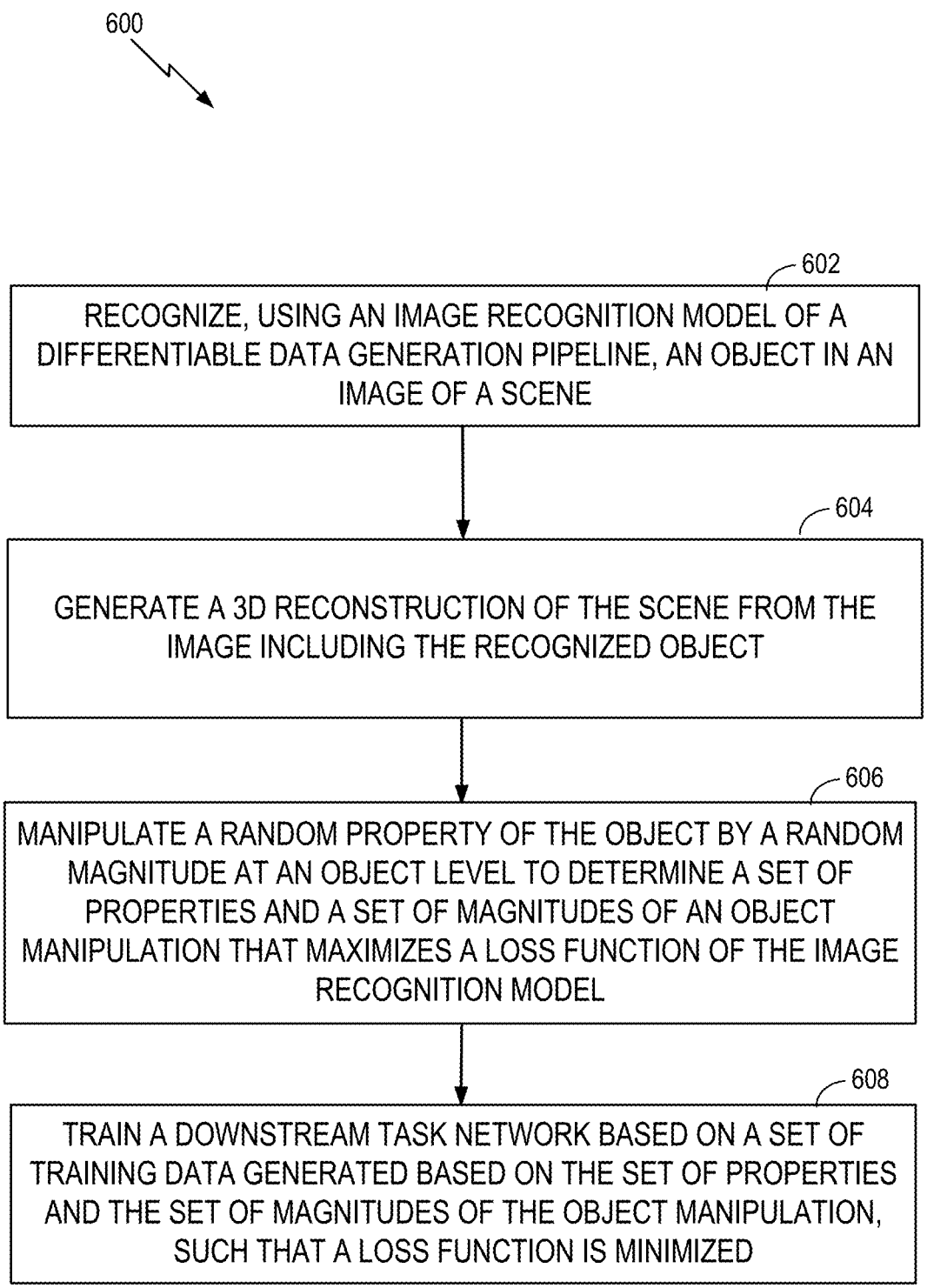
FIG. 6 is a flowchart illustrating a method for improving 3D object detection via object-level augmentations, according to aspects of the present disclosure.

FIG. 6 is a flowchart illustrating a method for improving 3D object detection via object-level augmentations, according to aspects of the present disclosure. The method 600 begins at block 602, in which an object in an image of a scene is recognized using an image recognition model of a differentiable data generation pipeline. For example, as shown in FIG. 3, the image recognition model 312 recognizes an object in an image of a scene captured by the car 350. For example, as shown in FIG. 4, a 3D object detector (e.g., the image recognition model 312 of FIG. 3) detects three vehicles in the input image 405 that are labeled with a 3D label 420a, a 3D label 420b, and a 3D label 420c. The image recognition model 312 provides the 3D label 420a, the 3D label 420b, and the 3D label 420c as inputs to a 3D reconstruction model 430, which may be configured, for example, as shown in FIG. 5.

At block 604, a 3D reconstruction of the scene is generated from the image including the recognized object. For example, as shown in FIG. 4, the 3D reconstruction model 430 uses an object centric database 440 storing pre-built, object centric implicit representations of objects to generate a 3D reconstruction of the input image 405. As shown in FIG. 5, the reconstruction system architecture 500 generates the recovered 3D scene 590 to enable the differential data generation pipeline 400, which is combined and jointly optimized with a downstream task network (e.g., the 3D object detection network 480).

At block 606, a random property of the object is manipulated by a random magnitude at an object level to determine a set of properties and a set of magnitudes of an object manipulation that maximizes a loss function of the image recognition model. For example, as shown in FIG. 4, an object level augmentation model 450 randomly generates an augmentation image 460 from the input image 405 using the 3D reconstruction of the scene generated by the 3D reconstruction model 430. For example, the object level augmentation model 450 generates the augmentation image 460 by manipulating the detected vehicle objects (e.g., as shown by the 3D label 420a, the 3D label 420b, and the 3D label 420c). In this example, the object level augmentation model 450 generates the augmentation image 460 by removing the detected vehicle objects represented by the 3D label 420b and the 3D label 420c. In addition, a detected vehicle object represented by the 3D label 420a is manipulated so that the detected vehicle object is now driving in the opposite direction.

At block 608, a downstream task network is trained based on a set of training data generated based on the set of properties and the set of magnitudes of the object manipulation, such that a loss function is minimized. For example, as shown in FIG. 4, the augmentation image 460 is provided as input to a downstream task network. In this example, the downstream task network is a 3D object detection network 480 that undergoes training 470 based on the augmentation image 460. In this example, the 3D object detection network 480 provides a downstream task gradient 490 as feedback to the object level augmentation model 450. In some aspects of the present disclosure, the object level augmentation model 450 is guided by the downstream task gradient 490, in which the augmentation image 460 is generated by a neural network of the object level augmentation model 450.

The method 600 further includes planning a trajectory of an ego vehicle according to detected 3D object vehicles. The method also includes feeding back a downstream task gradient from the downstream task network to the object level augmentation model. The method of 600 further includes labeling frames of a video stream using 3D object cuboids, in which the video stream comprises a monocular video stream. The method 600 may include the downstream task network as a 3D object detection network. The method 600 further includes propagating, using the 3D object detection network, downstream gradients to the object level augmentation model. In the method 600, the 3D reconstruction model may be an object centric neural implicit database of objects. The method 600 may perform training by generating the set of training data based on the set of properties and the set of magnitudes of the object manipulation based, at least in part, on a complete shape of the object, a refined estimated pose of the object, and a depth map for a background portion of the scene.

In some aspects of the present disclosure, the method 600 may be performed by the SOC 100 (FIG. 1) or the software architecture 200 (FIG. 2) of the ego vehicle 150 (FIG. 1). That is, each of the elements of method 600 may, for example, but without limitation, be performed by the SOC 100, the software architecture 200, or the processor (e.g., NPU 108) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits, such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more PGAs, PLDs, controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for improving 3D object detection via object-level augmentations, comprising:
    recognizing, using an image recognition model of a differentiable data generation pipeline, an object in an image of a scene;
    generating, using a 3D reconstruction model, a 3D reconstruction of the scene from the image including the recognized object;
    manipulating, using an object level augmentation model, a random property of the object by a random magnitude at an object level to determine a set of properties and a set of magnitudes of an object manipulation that maximizes a loss function of the image recognition model;
    generating a set of training data based on the set of properties and the set of magnitudes of the object manipulation in 3D augmentation images based, at least in part, on a complete, augmented shape of the object, an augmented pose of the object, and a depth map for a background portion of the scene; and
    training a downstream task network based on a set of training data, and to randomly change and place 3D objects back in the scene to create multiple versions of the scene to further train the downstream task network, such that the loss function is minimized.

2. The method of claim 1, further comprising planning a trajectory of an ego vehicle according to detected 3D object vehicles.

3. The method of claim 1, further comprising feeding back a downstream task gradient from the downstream task network to the object level augmentation model.

4. The method of claim 1, further comprising labeling frames of a video stream using 3D object cuboids, in which the video stream comprises a monocular video stream.

5. The method of claim 1, in which the downstream task network comprises a 3D object detection network.

6. The method of claim 5, further comprising, propagating, using the 3D object detection network, downstream gradients to the object level augmentation model.

7. The method of claim 1, in which the 3D reconstruction model comprises an object centric neural implicit database of objects.

8. A non-transitory computer-readable medium having program code recorded thereon for improving 3D object detection via object-level augmentations, the program code being executed by a processor and comprising:
    program code to recognize, using an image recognition model of a differentiable data generation pipeline, an object in an image of a scene;
    program code to generate, using a 3D reconstruction model, a 3D reconstruction of the scene from the image including the recognized object;
    program code to manipulate, using an object level augmentation model, a random property of the object by a random magnitude at an object level to determine a set of properties and a set of magnitudes of an object manipulation that maximizes a loss function of the image recognition model;
    program code to generate a set of training data based on the set of properties and the set of magnitudes of the object manipulation in 3D augmentation images based, at least in part, on a complete, augmented shape of the object, an augmented pose of the object, and a depth map for a background portion of the scene; and
    program code to train a downstream task network based on a set of training data, and to randomly change and place 3D objects back in the scene to create multiple versions of the scene to further train the downstream task network, such that the loss function is minimized.

9. The non-transitory computer-readable medium of claim 8, further comprising program code to plan a trajectory of an ego vehicle according to detected 3D object vehicles.

10. The non-transitory computer-readable medium of claim 8, further comprising program code to feed back a downstream task gradient from the downstream task network to the object level augmentation model.

11. The non-transitory computer-readable medium of claim 8, further comprising program code to label frames of a video stream using 3D object cuboids, in which the video stream comprises a monocular video stream.

12. The non-transitory computer-readable medium of claim 8, in which the downstream task network comprises a 3D object detection network.

13. The non-transitory computer-readable medium of claim 12, further comprising program code to propagate, using the 3D object detection network, downstream gradients to the object level augmentation model.

14. The non-transitory computer-readable medium of claim 8, in which the 3D reconstruction model comprises an object centric neural implicit database of objects.

15. A system for improving 3D object detection via object-level augmentations, the system comprising:
    an image recognition model of a differentiable data generation pipeline to recognize an object in an image of a scene;
    a 3D reconstruction model to generate a 3D reconstruction of the scene from the image including the recognized object;
    an object level augmentation model to manipulate the object by a random magnitude at an object level to determine a set of properties and a set of magnitudes of an object manipulation that maximizes a loss function of the image recognition model; and
    a 3D training data module to generate a set of training data based on the set of properties and the set of magnitudes of the object manipulation in 3D augmentation images based, at least in part, on a complete, augmented shape of the object, an augmented pose of the object, and a depth map for a background portion of the scene and to train a downstream task network based on the set of training data, and to randomly change and place 3D objects back in the scene to create multiple versions of the scene to further train the downstream task network, such that the loss function is minimized.

16. The system of claim 15, further comprising a planner to plan a trajectory of an ego vehicle according to detected 3D object vehicles.

17. The system of claim 15, in which the downstream task network comprises a 3D object detection network, the 3D object detection network is further to propagate, downstream gradients to the object level augmentation model.

\* \* \* \* \*